C. C. HALL.
DRAG SAW MACHINE.
APPLICATION FILED OCT. 30, 1911.
1,044,647.
Patented Nov. 19, 1912.
5 SHEETS—SHEET 1.
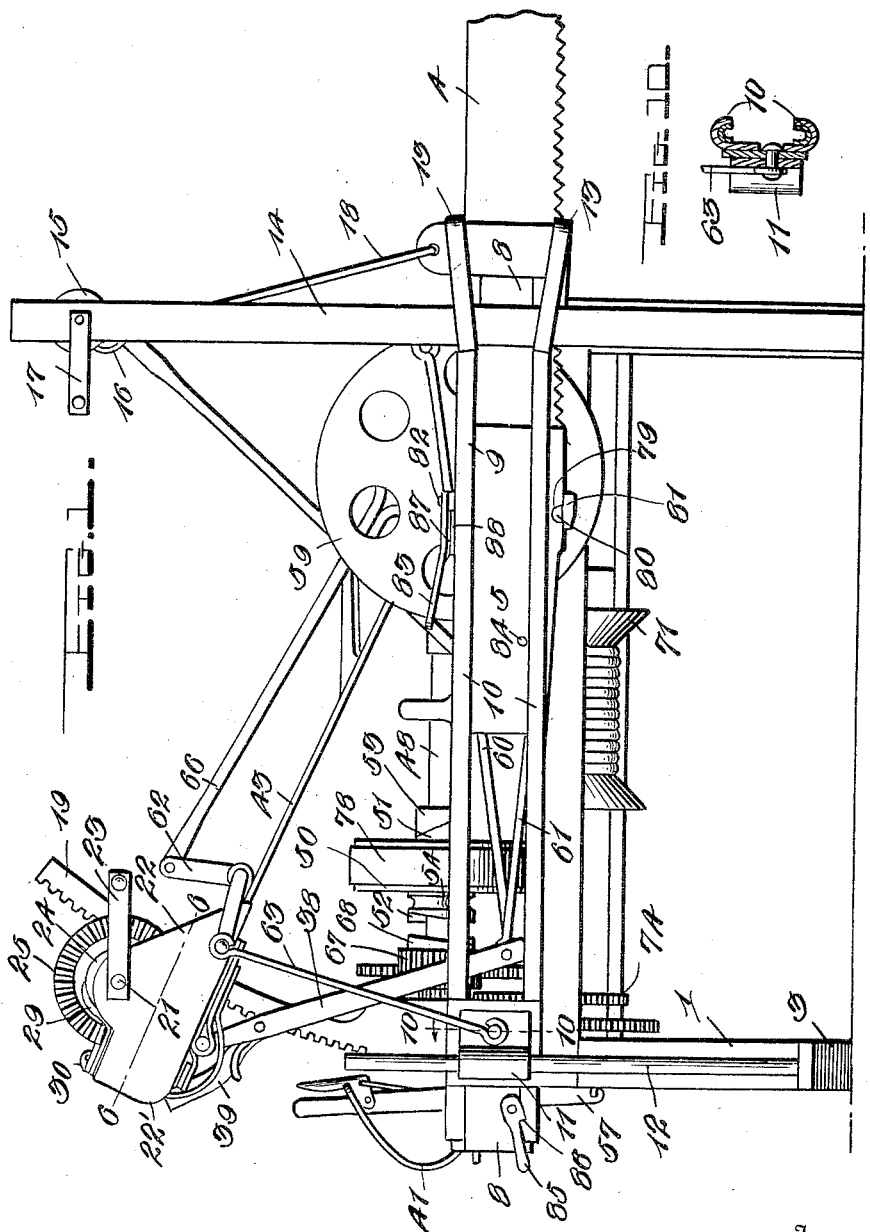
Witnesses
Chas. L. Griestaner
L. G. Ellis.
Inventor
C. C. Hall,
By Watson E. Coleman.
Attorney C. C. HALL.
DRAG SAW MACHINE.
APPLICATION FILED OCT. 30, 1911.
1,044,647.
Patented Nov. 19, 1912.
5 SHEETS—SHEET 2.
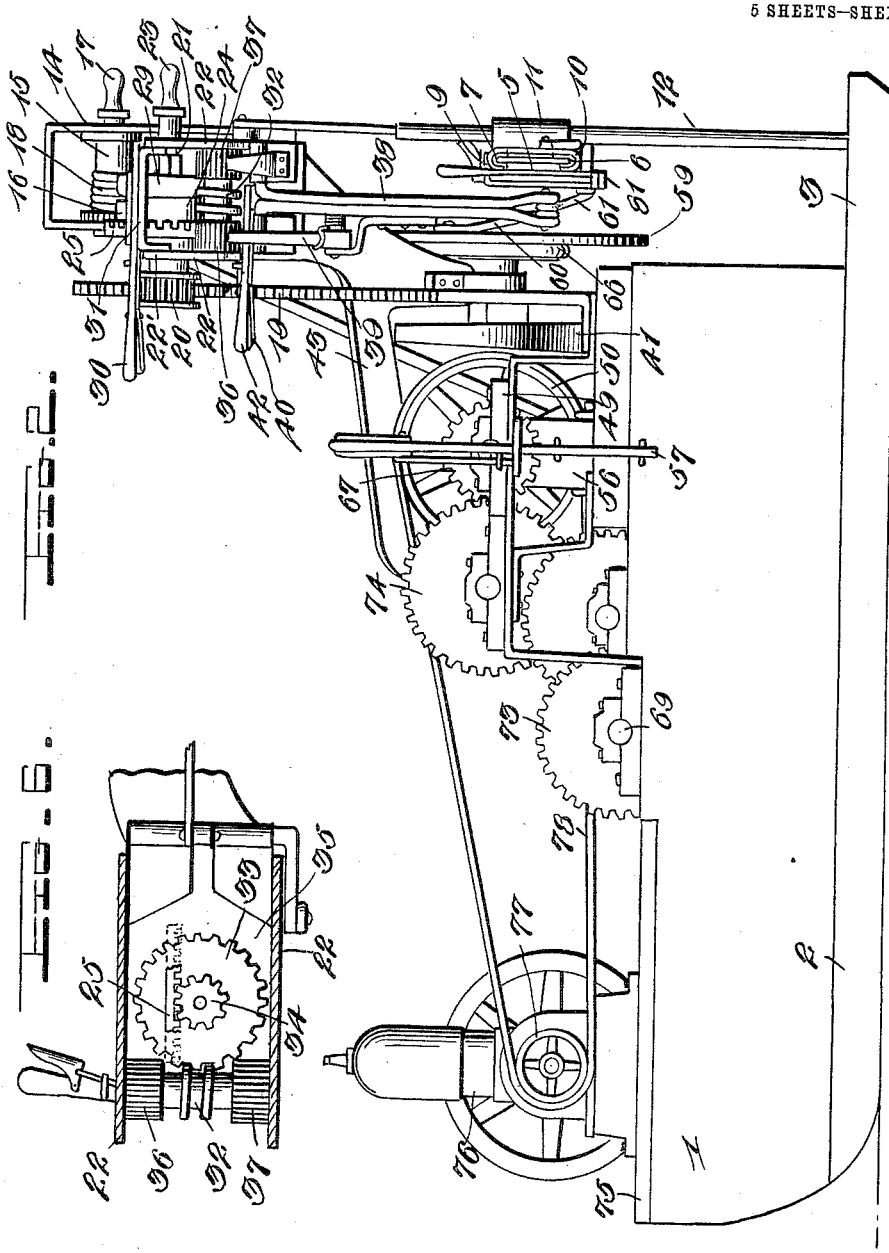
Witnesses
Chas. L. Griestaner.
L. H. Ellis.
Inventor
C. C. Hall,
By Watson E. Coleman.
Attorney

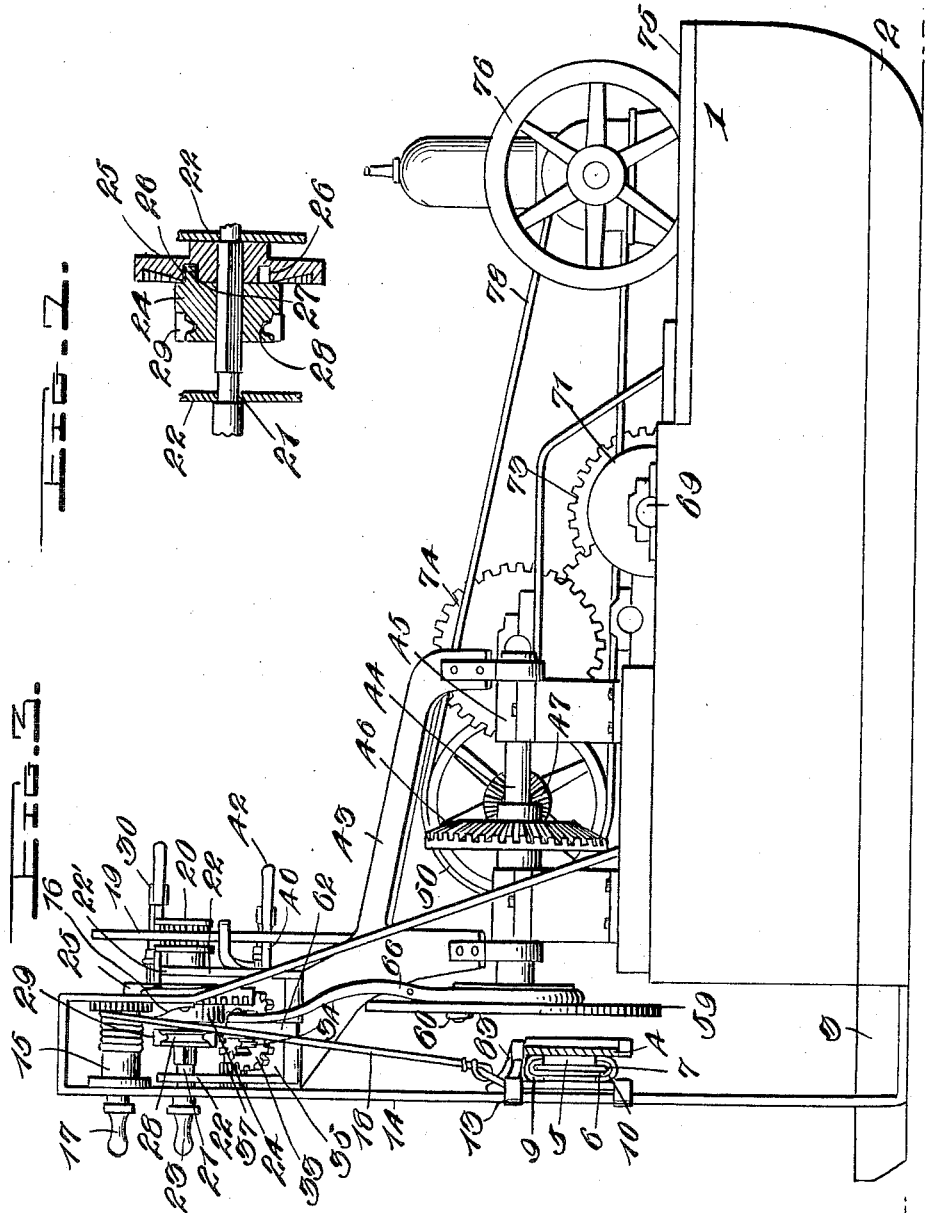

C. C. HALL.
DRAG SAW MACHINE.
APPLICATION FILED OCT. 30, 1911.
1,044,647.
Patented Nov. 19, 1912.
5 SHEETS—SHEET 4.
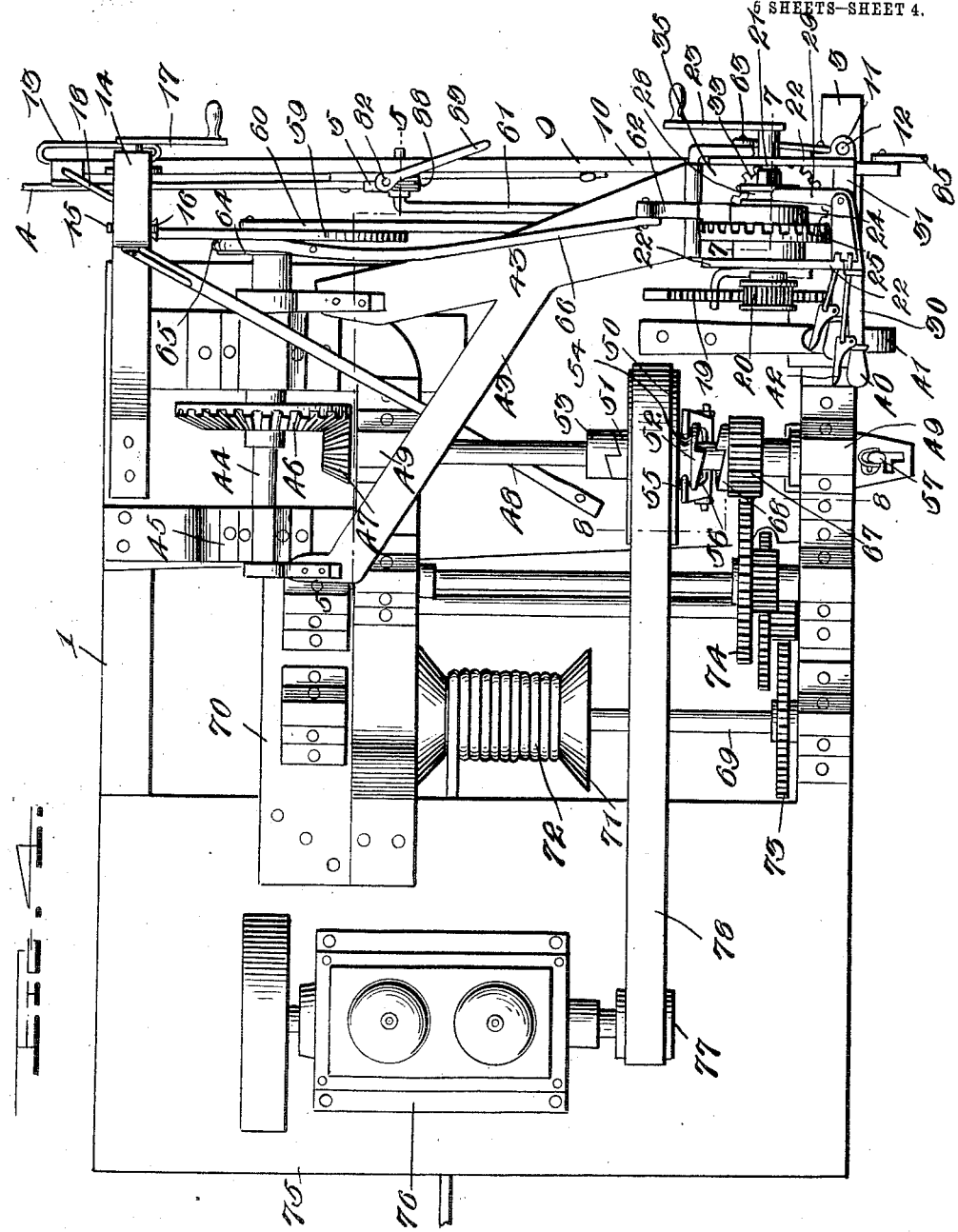
Witnesses
Chas. L. Griesbauer.
L. H. Ellis.
Inventor
C. C. Hall,
By Watson E. Coleman.
Attorney C. C. HALL.
DRAG SAW MACHINE.
APPLICATION FILED OCT. 30, 1911.
1,044,647.
Patented Nov. 19, 1912.
5 SHEETS—SHEET 5.
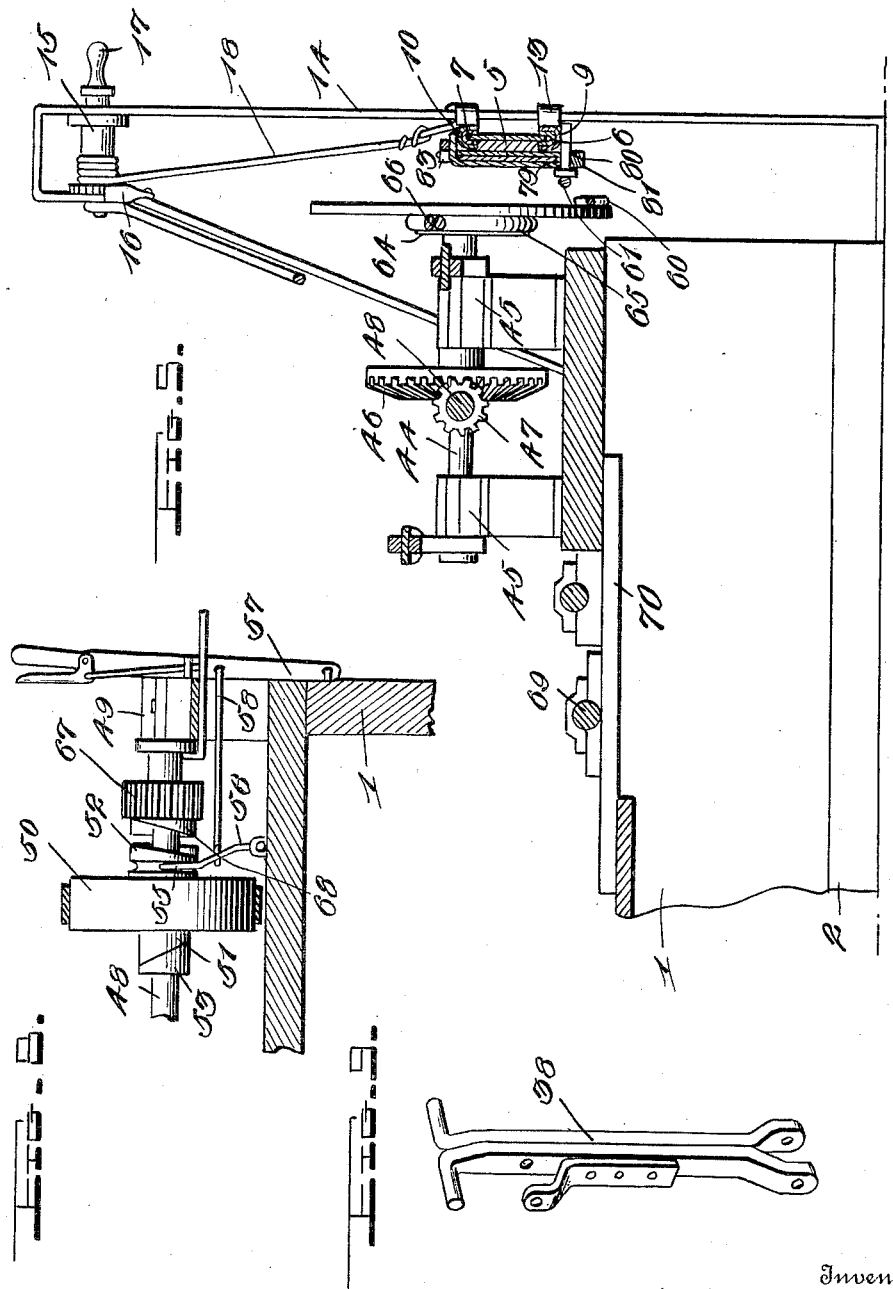
Witnesses
Chas. L. Grieshauer.
L. H. Ellis.
Inventor
C. C. Hall,
By Watson E. Coleman
Attorney

UNITED STATES PATENT OFFICE.

CALEB C. HALL, OF AMITY, OREGON.

DRAG-SAW MACHINE.

1,044,647. Specification of Letters Patent. Patented Nov. 19, 1912.

Application filed October 30, 1911. Serial No. 657,679.

*To all whom it may concern:*

Be it known that I, CALEB C. HALL, a citizen of the United States, residing at Amity, in the county of Yamhill and State of Oregon, have invented certain new and useful Improvements in Drag-Saw Machines, of which the following is a specification, reference being had to the accompanying drawings.

This invention relates to saw machines, and particularly to that type known as drag saw machines.

The invention has for its object to provide a machine of this character with simple and efficient means for automatically lowering the saw during its operation.

Another object of the invention is to provide means whereby the saw may be removed from the sawed logs in a horizontal direction, which is oft times necessary due to the fact that the abutting ends of the logs when sawed will bind the saw blade and the same cannot be removed by vertical movement.

A still further object of the invention is to provide a machine of this character which is operated by a motor, a gas engine being particularly well adapted for this purpose.

A still further object of the invention is to provide a device of this kind with a simple and efficient means for raising the saw guide and saw into a position for sawing the timbers.

Other objects of this invention will become apparent as it is more fully set forth.

In the accompanying drawings: Figure 1 is a rear elevation of the machine; Fig. 2 is a side elevation of the same; Fig. 3 is a similar view, the same being opposite that of Fig. 2; Fig. 4 is a plan view; Fig. 5 is a sectional view as seen on line 5—5, Fig. 4; Fig. 6 is a sectional view as seen on line 6—6, Fig. 1; Fig. 7 is a sectional view as seen on line 7—7, Fig. 4; Fig. 8 is a sectional view as seen on line 8—8, Fig. 4, and Fig. 9 is a perspective view of the link member; Fig. 10 is a section as seen on line 10—10, Fig. 1.

Referring to the drawings the numeral 1 designates a support, the same being provided with suitable supported runners 2, one of said runners having its rear end extending slightly beyond the platform 3. The saw 4 is rigidly connected at its inner end to a head 5, said head being adapted to slide in a guide 6. The guide 6 consists of a pair of spaced channel members 7, said members being held in their spaced parallel relation by blocks 8. The guide 6 is mounted in a hanger 9, said hanger consisting of upper and lower spaced parallel grooved members 10, the inner end of said members being pivotally connected to a sleeve 11, said sleeve being adapted for vertical travel upon the rod 12, the lower end of which is secured to the extending end of one of the runners 2. The hanger is provided at its outer end with guide straps 13, whereby the outer end of the hanger 9 is permitted to move vertically, but is prevented from moving backwardly. The guide straps 13 are passed around a vertically arranged bar 14 the upper end of which is curved and extended downwardly in an inclined position and is secured rigidly to the upper surface of the platform 3, and near the end thereof.

Rotatably mounted in the upper end of the bar 14 is a drum 15, the same having one of its flanges provided with ratchet teeth for engagement with a pawl 16, said pawl being pivotally connected to the inclined portion of the bar 14. The drum 15 is provided with a crank handle 17 which when operated will wind a cord 18 to lift the outer end of the hanger 9, it being of course understood that the rope 18 is connected in a suitable manner to the outer end of said hanger.

Supported on the platform 3 and near the end thereof is a curved rack bar 19, the same being arranged in a vertical position. Adapted to mesh with the rack bar 19 is a pinion 20, the same being connected to the inner end of a shaft 21. The shaft 21 is supported by plates 22, of a casing 22′ said plates being arranged in a spaced parallel relation. The shaft 21 has rigidly secured to its outer end a crank handle 23 by which said shaft is rotated. The shaft 21 is squared for a portion of its length and slidably mounted on the squared portion thereof is a clutch head 24, the same being adapted to coact with the gear 25 the outer face of which is provided with a series of depressions 26, said depressions being for the purpose of receiving a pin 27 carried upon the inner face of the clutch head 24, so that when the shaft 21 is rotated the pinion 20 will cause the gear casing 22′ to travel upwardly, thereby raising the inner end of the saw hanger 9. The clutch head 24 is provided with an annular groove 28, in which the opposing ends of a yoke 29 engage. The yoke 29 is formed integral with a hand lever 30, the same being pivotally connected to a brace bar 31, the opposite ends of which are supported by the plates 22. The hand lever 30 when moved in one direction will slide the clutch head 24 out of engagement with the gear 25 to permit the rotation of the shaft 21, whereby the pinion 20 will move upwardly upon the rack bar 19 to any desired position, and upon operation of the hand lever 30 in an opposite direction the clutch head will engage the gear 25 and prevent rotation thereof, thereby holding the inner end of the saw hanger 9 in an adjusted position. A worm screw 32 is provided and has its opposite ends rotatably mounted in the plates 22 of the casing 22', said worm being adapted to mesh with a worm gear 33, said gear being provided with a gear 34, the same being adapted to mesh with gear 25. The worm gear 33 is rotatably mounted on the bottom plate 35 of the casing 22', said plate being formed integral with the side plates 22. The worm screw 32 has formed upon opposite sides thereof inner and outer ratchets 36 and 37. From this construction it will be seen that by providing the casing 22', an efficient structure has been produced for supporting the shaft 21 and the gearing for operating the pinion 20, for its proper operation in connection with the rack bar 19, whereby the casing 22' is mounted for manual and automatic adjustment.

Pivotally connected to the under surface of the bottom plate 35 of the casing 22', is the upper end of a link 38, the purpose of which will be hereinafter described. Pivotally connected to one side of the link 38 is a spring pressed pawl 39 the upper end of which is adapted to intermittently engage the teeth of the ratchet 36 upon movement of the link 38. A lever 40 is provided, and has its inner end pivotally connected to the bottom plate 35, and is arranged to disengage the pawl 39 from the ratchet 36 during the downward movement of the plates 22. This is accomplished by a curved plate 41, which is mounted upon the platform 3 and in line of travel of the lever 40. The lever 40 is provided with a spring-actuated hand grip 42, which is adapted to contact with the curved plate 41 to disengage the pawl 39, thereby stopping the downward travel of the plates 22. When the link 38 is rocked the pawl 39 will successively engage the teeth of the ratchet 36 and will rotate the gear 34, thereby transmitting movement through the worm gear 33 to the pinion 20, which movement will allow the plates 22 and the parts supported thereby to travel downwardly until the lever 40 is operated to disengage the pawl 39.

Rigidly connected to the bottom plate 35 is one end of a connecting bar 43. The other end of the connecting bar 43 is bifurcated, the bifurcated ends of which are pivotally connected to a longitudinally arranged shaft 44, said shaft being rotatably mounted in suitable bearings 45.

Rigidly connected intermediate the ends of the longitudinally arranged shaft 44 is a bevel gear 46, said gear being adapted to mesh with a bevel pinion 47 secured to the end of a transversely arranged shaft 48, said shaft being journaled in bearings 49. Loosely mounted upon the shaft 48 is a belt pulley 50, the same being provided upon its opposite sides with clutch faces 51 and 52 respectively. Fixed around the shaft 48 and adapted to coact with the clutch face 51 of the belt pulley 50 is a clutch member 53, and when said faces are in engagement rotary movement is imparted to the shaft 48, which in turn rotates the shaft 44. The clutch face 52 is provided with an annular groove 54 in which is positioned the forked upper end 55 of a rock lever 56, said lever being pivotally connected to the platform 3. A hand lever 57 is pivotally connected at its lower end to the platform 3 and is connected to the rock lever 56 by a link 58. Upon operation of the hand lever 57 the lever 56 is rocked to engage and disengage the clutch member 53 and clutch face 51.

Rigidly connected to the outer end of the shaft 44 is a disk 59 to which is pivotally connected one end of a pitman 60, the other end of said pitman being connected to the lower end of the link 38, the said link being rocked upon rotation of the disk 59. A pitman 61 is also provided and has one of its ends pivotally connected to the link 38 its other end pivotally connected to the saw head 5, thereby reciprocating the saw head in the hanger 9 upon rotation of the disk 59.

Mounted on the connecting bar 43, and adjacent to the plates 22 is a bell crank lever 62 to one arm of which is connected a link 63, the lower end of said link being pivotally connected to the sleeve 11. Upon the inner surface of the disk 59 is fixed an eccentric 64, the same being provided with a peripheral groove 65. Encircling the eccentric 65 is the outer end of a rod 66, the inner end of which is pivotally connected to the bell crank lever 62. Upon rotation of the disk 59 the bell crank lever 62 is rocked, thereby causing the inner end of the hanger 9, by the connection of the link 63 to move up and down to impart the proper movement to the saw 4 when in operation, such movement tending to remove the sawdust during the sawing operation, and at a time when the saw is on its back stroke.

Loosely mounted on the shaft 48 is a pinion 67 said pinion having one of its faces provided with a clutch 68, said clutch being adapted to coact with the clutch face 52 upon the pulley 50. Upon operation of the hand lever 57 the pulley 50 is moved upon the shaft 48 a sufficient distance for the clutch face 52 thereof to engage with the pinion 67, which causes said pinion to rotate. Suitably mounted above one of the runners 2 is one end of a shaft 69, the other end of which is mounted in a sill 70. Fixed upon the shaft 69 is a drum 71, around which is wound a cable 72. To one end of the shaft 69 is a fixed gear 73, which is operated by a train of gearing 74, which is adapted to mesh with the pinion 67. When the shaft 48 is rotated, and at a time when the belt pulley mounted thereon is in clutch engagement with the pinion 67 the train of gearing will be operated to wind the cable 72, the other end of which has been previously fastened to a tree trunk or any suitable anchor so that the winding of the cable upon the drum will draw the machine toward the fixed object, when it is desired to move the machine after properly sawing the log or logs, and it is desired to position the machine in a convenient relation with other logs.

Mounted on the platform 75 is a gas engine 76, the shaft of which is provided with a belt pulley 77, from which passes a belt 78, said belt passing around the belt pulley 50 for imparting movement to the shaft 48 for operating the saw.

It is quite frequent that after a log has been sawed through, the saw will be clamped or pinched between the ends thereof in such a manner that the saw cannot be released upon vertical movement, and to overcome this, means have been provided, whereby the saw blade may be withdrawn in a horizontal direction. This is accomplished by providing a transverse groove 79 in the lower edge of the saw head 5 and in which is detachably mounted a bearing 80, adapted to be held by a latch 81, said latch being connected to the lower end of a rod 82 which is rotatably mounted upon the head 5. To the upper end of the rod 82 is a fixed handle 83, which when operated will swing the latch 81, thereby permitting the bearing 80 to drop. The pitman 61 is pivotally connected on the bearing 80; thus upon operation of the latch 81 the pitman 61 is disengaged from the saw head 5, thereby allowing said head to slide in the guide 6 until the pin 84 carried upon the head 5 engages the rear block 8, and upon further movement of the head will cause the guide 6 as well as the saw head 5 to slide a sufficient distance in the hanger 9 to remove the saw from the sawed log. The guide 6 is held against accidental displacement by a gravity latch 85, the same being pivotally connected to one of the blocks 8, and coacting with a notch 86 formed in the inner end of the hanger 9. The handle 83 is held against accidental rotation by a spring 87, which is adapted to engage with the serrated face of a plate 88 carried by the saw head 5. To more readily permit the sliding of the saw head 5 in the hanger 9 a handle is provided, the same being connected to the saw head 5.

While I have particularly described the elements most well adapted to perform the functions set forth, it is obvious that various changes in form, proportion and in the minor details of construction may be resorted to without departing from the spirit or sacrificing any of the principles of the invention.

Having thus described the invention, I claim:—

1. In a drag saw machine, the combination with a platform, a rack bar supported upon said platform, a hanger, a saw head adapted for reciprocation in said hanger, a pair of spaced plates, a shaft journaled in said plates, a gear mounted upon said shaft, a worm gear carried by said plates and adapted to rotate said gear, a pinion rigidly connected to one end of the shaft to mesh with the rack bar, a crank connected to the other end of said shaft and adapted to, when operated, rotate said pinion and raise or lower the plates upon the rack bar, and means for intermittently operating the worm gear to automatically lower the plates.

2. In a drag saw machine, the combination with a supporting platform, a driving and driven shaft, operating means between said shafts, a disk fixed to one end of the driven shaft, a connecting bar having its inner ends pivotally connected to the driven shaft, a pair of spaced plates mounted upon the outer end of the connecting bar, a shaft journaled in said plates and having a pinion fixed to one end thereof, a vertically supported rack bar arranged adjacent to the plates, said pinion being adapted to mesh with the rack bar, means for rotating the pinion to raise and lower said plates, a hanger on said platform, a saw adapted for reciprocation upon said hanger, and means having connection with said disk and engaged with the saw hanger to raise and lower one end thereof.

3. In a drag saw machine, the combination with a supporting platform, of a driving and driven shaft, a disk secured to one end of the driven shaft, a gear casing mounted upon the outer end of a connecting bar, the inner end of said connecting bar being pivotally connected to the driven shaft, a rack bar mounted upon the platform and adjacent to the travel of the gear casing, means carried by the gear casing and coöperating with said rack bar to raise and lower said casing manually, a saw hanger, a saw head slidably mounted in said hanger, a link having its upper end pivotally connected to the bottom of the gear casing, a pitman connecting the lower end of said link and disk, a second pitman connecting the lower end of the link and saw head, whereby when the disk is rotated reciprocatory movement is imparted to the saw head, means for raising and lowering the inner end of the hanger, and means for automatically lowering the gear casing during the reciprocation of the saw head.

4. In a machine of the class described, the combination with a driving and driven shaft, of a saw hanger, a saw head adapted to reciprocate in the hanger, a rack bar, a gear casing mounted on the outer end of a connecting bar, the inner end of said connecting bar being pivotally connected to the outer end of the driven shaft, means carried by said casing and coöperating with the rack bar for manually raising and lowering said casing, a disk carried on the end of the driven shaft, an eccentric secured to said disk, a bell crank lever mounted upon said bar, a pitman connecting said eccentric and one arm of the bell crank, a link pivotally connected to the other arm of the bell crank at its upper end and having its lower end pivotally connected to the hanger, whereby when the disk is rotated the inner end of said hanger will be raised and lowered, a link pivotally connected at its upper end to the bottom of the gear casing, a pitman connected to the lower end of said link and saw head to impart reciprocatory movement to the said head when movement is imparted to the link, said crank handle being adapted to rotate the pinion to raise and lower the gear casing whereby the outer end of the hanger is adjusted, and means carried by the last mentioned link to operate the said pinion to automatically lower the gear casing, and means carried by the gear casing to limit the downward movement thereof.

5. In a machine of the class described, the combination with a platform, and a driving and driven shaft mounted thereon, of a saw hanger arranged adjacent to one end of the platform and adapted for vertical adjustment, a disk connected to one end of the driven shaft, a bar pivotally connected to the driven shaft, a gear casing mounted upon the free end of said bar, a rack bar supported upon the platform and arranged adjacent to the gear casing, means carried by the gear casing to raise and lower the same, said means operated in conjunction with said rack bar, a guide mounted in said hanger, a saw head mounted in said guide, a link pivotally connected to the bottom of the casing, and coöperating with means therewithin for automatically lowering said casing, and means connecting said link with the saw head.

In testimony whereof I hereunto affix my signature in the presence of two witnesses.

CALEB C. HALL.

Witnesses:
JOHN T. STEUBBE,
GEO. W. CASE, Jr.

---

Copies of this patent may be obtained for five cents each, by addressing the "Commissioner of Patents, Washington, D. C."